United States Patent
Nishizawa et al.

(10) Patent No.: US 6,905,236 B2
(45) Date of Patent: Jun. 14, 2005

(54) VEHICULAR LAMP

(75) Inventors: Takaaki Nishizawa, Shizuoka (JP); Kaoru Yamamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 34 days.

(21) Appl. No.: 10/640,812

(22) Filed: Aug. 14, 2003

(65) Prior Publication Data

US 2004/0032744 A1 Feb. 19, 2004

(30) Foreign Application Priority Data

Aug. 19, 2002 (JP) ........................................ 2002-238449

(51) Int. Cl.⁷ ................................................ B60Q 1/00
(52) U.S. Cl. ...................... 362/539; 362/520; 362/455
(58) Field of Search .............................. 362/520, 538, 362/539, 335, 455

(56) References Cited

U.S. PATENT DOCUMENTS 5,119,276 A * 6/1992 Suzuki ...................... 362/539
6,086,231 A * 7/2000 Kenjo et al. ................ 362/507
6,416,210 B1 * 7/2002 Uchida ....................... 362/539

FOREIGN PATENT DOCUMENTS

FR           2 687 760         8/1993

* cited by examiner

Primary Examiner—Ali Alavi
(74) Attorney, Agent, or Firm—Koda & Androlia

(57) ABSTRACT

A vehicular lamp having a projection-type light source unit installed in its lamp chamber. The projection-type light source unit includes a reflector that has a light source and a cylindrical lens holder that is disposed on the front end of the reflector and is provided with a convex lens at its front end so that the peripheral portion of the convex lens is fixed to the front edge of the lens holder by a lens fixture. The lens holder has, on the inner or interior side of the front edge, a lens engaging portion so that the peripheral portion of the convex lens is engaged with this lens engaging portion from behind, and the convex lens is securely held at its peripheral portion on the lens engaging portion by the lens fixture (a lens fitting, a fastening screw, a boss having a screw hole) provided inside the lens holder.

6 Claims, 5 Drawing Sheets

VEHICULAR LAMP

BACKGROUND OF THE INVENTION

1. Field of the Invention

The present invention relates to a vehicular lamp and more particularly to a vehicular lamp that has a projection-type light source unit in its lamp chamber.

2. Prior Art

FIG. 7 shows a prior art vehicular lamp that has a projection-type light source unit. In this vehicular lamp shown, the lamp chamber, which is formed by a lamp body 1 and a front cover 2, houses the light source unit. The light source unit is formed by a substantially ellipsoid reflector 3, which has a light bulb 4, a projection convex lens 6, and a cylindrical lens holder 5 interposed between the reflector 3 and the light bulb 4. The reference numeral 7 denotes a toric lens fitting that is a holding member and holds the peripheral portion 6a of the convex lens 6 on the lens engaging portion 5a of the lens holder 5. The lens fitting 7 is fastened by screws 7a to the lens holder 5. The reference numeral 8 denotes a shade that forms a clear cut line of a low beam, and the reference numeral 9 denotes an extension reflector that extends between the front opening of the lamp body 1 and the light source unit.

In this conventional vehicular lamp, the convex lens 6 and the lens holder 5 are fixed by mounting the lens fitting 7 from the front of the lens holder 5 and then by fastening the lens fitting 7 by screws 7a. In this structure, the lens fitting 7, the fastening screws 7a and the bosses 5b having screw holes form a lens fixing means, and this lens fixing means is provided on the exterior of the projection-type light source unit (or the lens holder 5). For this reason, the inside of the lamp chamber can be seen through the front cover 2 when the lamp is not lit; and in addition, the structure, in which the front end portion of the light source unit that has the lens fixing means on its outside periphery protrudes forward from the opening of the extension reflector 9, can be seen also. Thus, the problem of this lamp is that its external appearance is poor.

SUMMARY OF THE INVENTION

The present invention solves the foregoing problems with the prior art.

It is an object of the present invention to provide a vehicular lamp having an improved appearance when it is not lit by providing a lens fixing means in the lens holder so that the lens fixing means is prevented from being exposed to the outside of a projection-type light source unit.

The above object is accomplished by a unique structure of the present invention for a vehicular lamp that includes a projection-type light source unit installed in the lamp chamber, wherein the projection-type light source unit includes a reflector that has a light source and a cylindrical lens holder that is disposed on the front end of the reflector and is integrally mounted with a convex lens at its front end so that the peripheral portion of the convex lens is fixed to the front edge of the lens holder by a lens fixing means; and in this structure, the lens holder is formed on the inner side of the front edge thereof with a lens engaging portion so that the peripheral portion of the convex lens is engaged with this lens engaging portion from behind, and the convex lens is securely held at its peripheral portion on the lens engaging portion by the lens fixing means provided in the lens holder.

In this structure, the means that fixes the convex lens can be screw fixing, spring (elastic) fixing, caulk fixing, concavo-convex engagement fixing, and the like. When the convex lens is made of glass and fitted by screws to the lens holder made of a metal, the peripheral portion of the convex lens is fixed by screws with a metallic lens fitting, which is a holding member, interposed in between. This structure allows the convex lens to be secured without getting any damage and without getting loosened. Furthermore, when the convex lens is fixed by spring fixing or caulking fixing, the peripheral portion of the convex lens is fixed to the lens engaging portion by an elastic member such as a heat resistant rubber or a wavy washer. When concavo-convex engagement fixing is employed, the peripheral portion of the convex lens is engaged with the lens engaging portion in a concavo-convex fitting by way of covering the peripheral portion of the convex lens with an elastic member such as a heat resistant rubber that has a U-shaped cross-section.

As seen from the above, since the lens fixing means is located inside the lens holder in the present invention, the lens fixing means is not exposed to the outside of the lens holder (of the light source unit).

In the above structure, the lens fixing means is provided so that it is located outside the outer diameter of the convex lens.

When the lens fixing means is located inside the outer diameter of the convex lens or is located inside the outer circumference of the convex lens, the lens fixing means protrudes into a path on which light reflected by the reflector travels toward the convex lens. Consequently, a desirable light distribution is not formed since light which contributes to the light distribution is shaded by the lens fixing means, or light reflected by the lens fixing means is emitted from the convex lens so as to form light which is undesirable for light distribution, such as glare light. However, in the present invention, the lens fixing means is provided so as to be located outside the outer diameter of the convex lens (thus not on the path of light which contributes to formation of the light distribution). Thus, light that contributes to the light distribution is not shaded by the lens fixing means. Furthermore, light that is reflected by the lens fixing means and is undesirable for the light distribution is shaded by the front edge of the lens holder (lens engaging portion) and is not emitted from the convex lens.

Furthermore, in the vehicular lamp of the present invention, the lens engaging portion is comprised of an inner flange provided around the inside of the front edge of the lens holder, and the lens fixing means is comprised of a toric metal lens fitting that holds the peripheral portion of the convex lens to the lens engaging portion, two bosses formed inside the lens holder and have screw holes, and fastening screws that secure the lens fitting by being screwed to the screw hole of the bosses.

The toric lens fitting makes a tight contact with the inner surface of the lens holder, and it does not protrude to the light path and thus does not prevent the formation of light distribution.

In addition, the toric lens fitting, by functioning in corporation with the ring-shaped inner flange portion, sandwiches the peripheral portion of the convex lens, so that it securely holds the convex lens to the lens holder without looseness.

Furthermore, the peripheral portion of the convex lens can be securely held easily by the lens engaging portion by imposing the lens fitting and by screwing the fastening screws to the screw holes formed in the bosses.

In the present invention, a shade that forms a clear cut line is fixed, together with the lens fitting, to the boss of the projection-type light source unit Thus, the lens fixing means functions also to fix the shade that forms a clear cut line.

Furthermore, in the vehicular lamp of the present invention, the outer peripheral surface of the lens holder has a curved shape which is generally continuous from the front (convex) surface of the convex lens, and an area from the convex lens to the lens holder protrudes forward of an extension reflector that is disposed inside the lamp chamber and extends around the light source unit.

The area on the light source unit from the convex lens to the lens holder protrudes forward of the extension reflector is formed to have a sleek oval shape that is similar to the contour of the convex lens. Accordingly, when the lamp is not lit, the front edge area of the light source unit that has a sleek oval shape is seen through the front cover.

DETAILED DESCRIPTION OF THE INVENTION

A detailed description of the embodiments of the vehicular lamp according to the present invention will be presented below.

Figure 1:
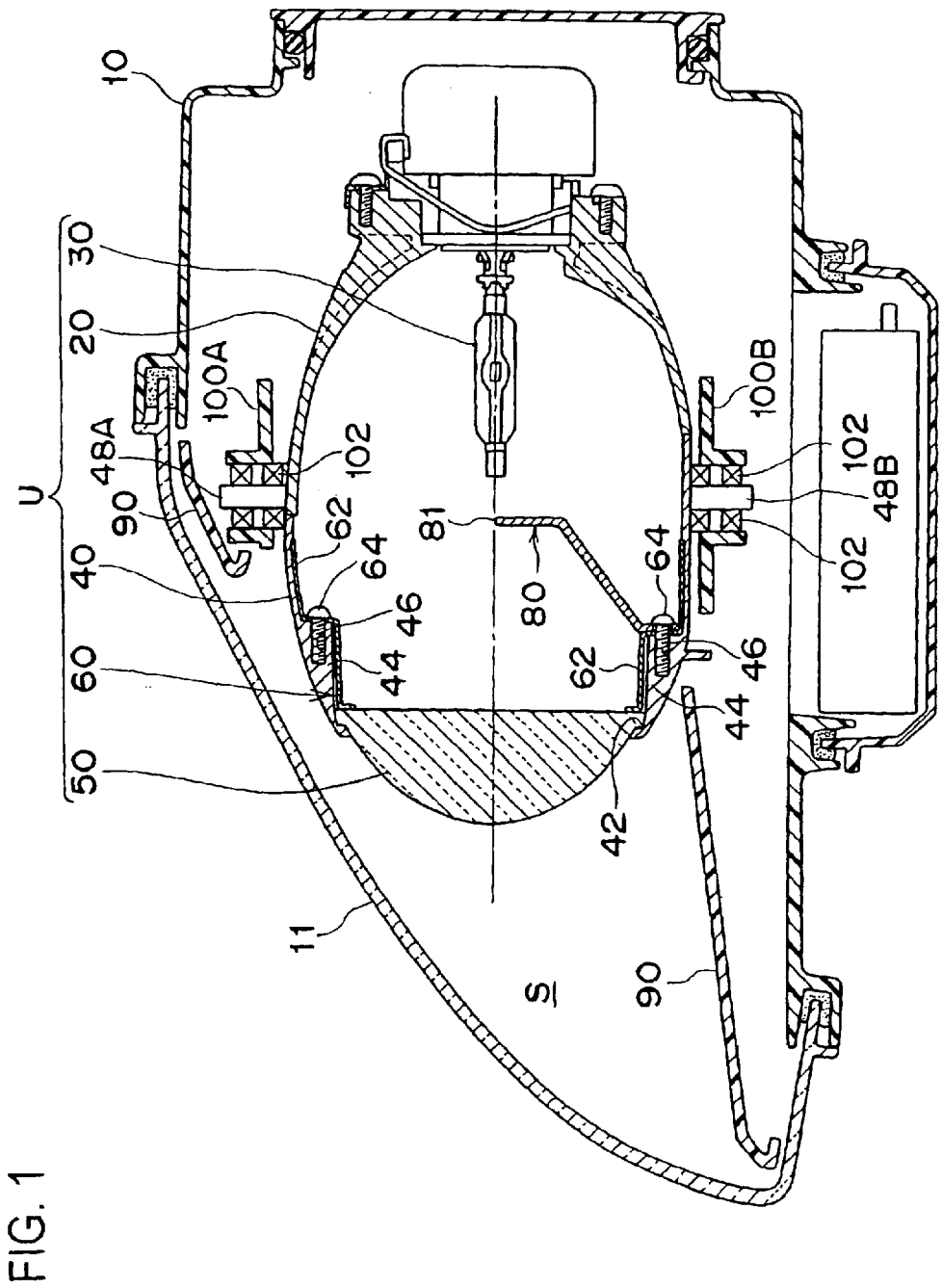
FIG. 1 is a longitudinal cross-sectional view of the vehicular headlamp according to the first embodiment of the present invention.
Figure 2:
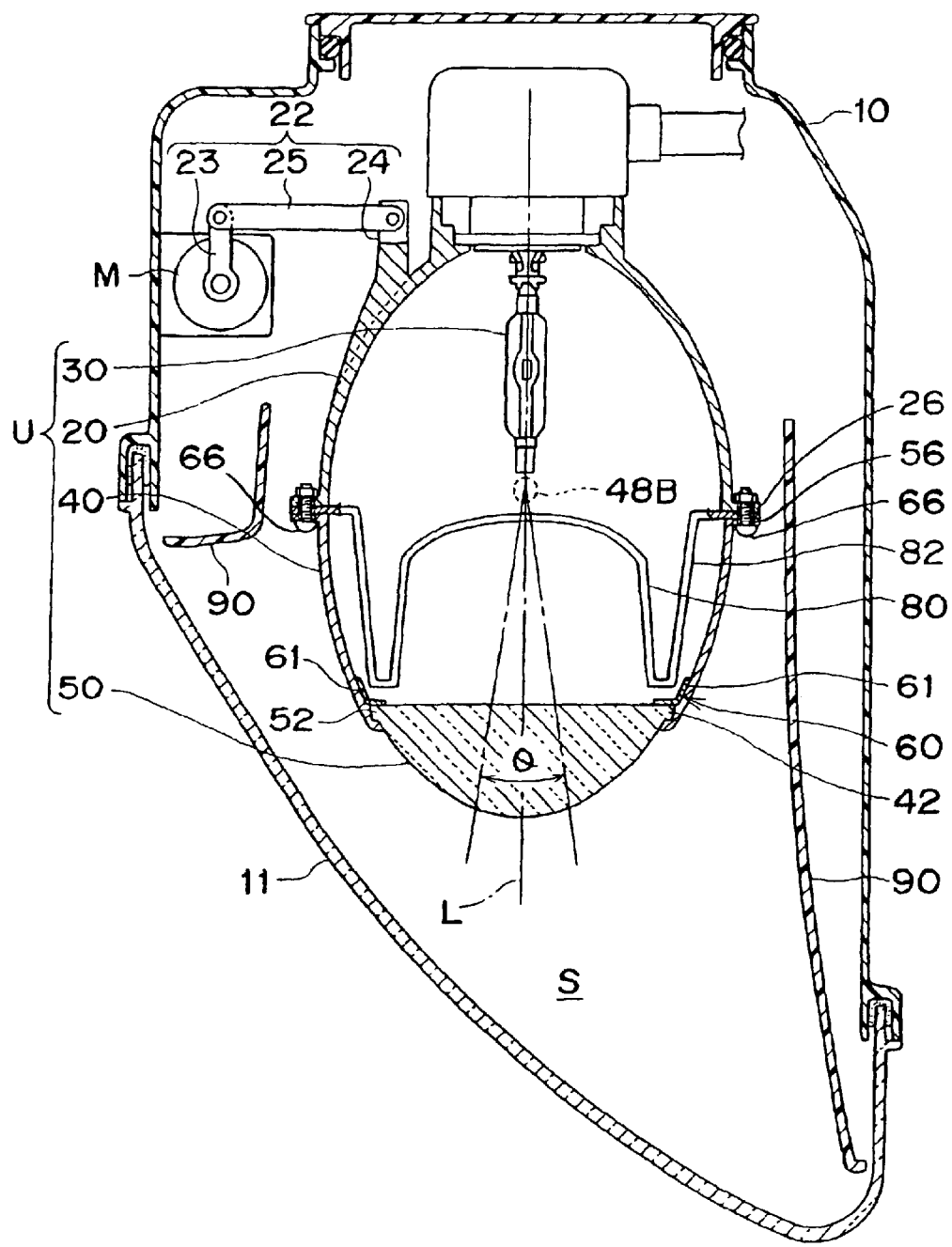
FIG. 2 is a horizontal cross-sectional view thereof.
Figure 3:
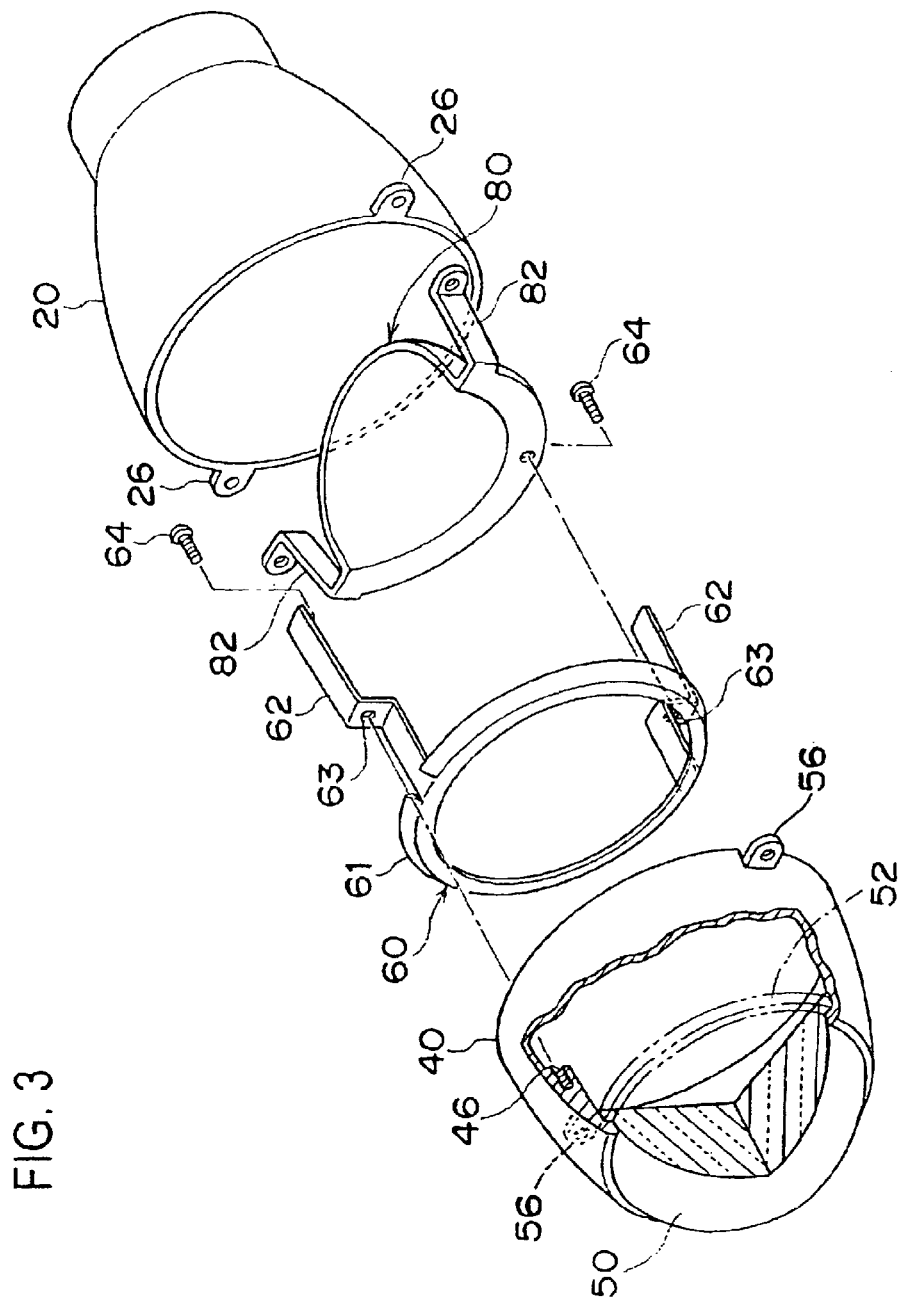
FIG. 3 is an exploded perspective view of the light source unit which is the main element of the headlamp.

In FIG. 1 to FIG. 3, the reference numeral 10 denotes a container-shaped lamp body that has an oblique opening extending from its front portion toward its side portion. A transparent front cover 11 having a side surface curved toward its rear portion as best seen from FIG. 2 is provided on the front opening of the lamp body 10, thereby providing a lamp chamber S that has a shape curved from its front to the side. The lamp chamber S houses a projection-type light source unit U that provides a low beam.

The light source unit U is comprised of a substantially ellipsoid reflector 20, a discharge bulb 30, a cylindrical lens holder 40 and a projection convex lens 50. The ellipsoid reflector 20 is made of die-cast aluminum treated with aluminum vapor deposition treatment (mirror face treatment) on its inside surface. The discharge bulb 30 is a light source inserted into a bulb insertion hole 22 of the reflector 20. The projection convex lens 50 has a circular shape when viewed from the front (and from the back), and it is integrally installed on the cylindrical lens holder 40 that is made of die-cast aluminum and is disposed on the front end of the reflector 20. In other words, the convex lens 50 is provided in front of the reflector 20 with the cylindrical lens holder 40 in between.

The discharge center of the discharge bulb 30 is set near the first focal point of the reflector 20, and an upper edge of a shade 80 that forms a clear cut line is set at a rear focal point of the convex lens 50 and at the second focal point of the reflector 20. The light source unit U that forms a low beam is thus constructed.

The convex lens 50, the lens holder 40 and the reflector 20 have curved shapes that are generally flush at mating portions, so that the overall contour of the light source unit U has a sleek oval shape.

Along the inside circular front edge of the lens holder 40, a lens engaging portion 42 is provided, with which the flange-shaped rear peripheral portion of the convex lens 50 is engaged from behind or from the rear portion. In addition, a pair of bosses 44 having therein screw holes 46 (formed with female screw threads) are formed at upper and lower positions that face each other on the interior of the lens holder 40. In other words, two bosses 44 having female screw holes 46 are formed at a location substantially diametrically opposite each other in the interior front edge of the lens holder 40. The flange-shaped peripheral portion of the convex lens 50 is engaged with the lens engaging portion 42 of the lens holder 40 and is securely held by a metallic toric lens fitting 60 fixed by screws to the bosses 44.

More specifically, as seen from FIG. 3, the lens fitting 60 is structured such that a pair of bent legs 62 extend from a holding frame 61 that has a toric shape and a dogleg-shaped cross-section. Thus, the lens fitting 60 has, as seen from FIG. 1, a shape that allows the lens fitting 60 to be fitted to the inner peripheral face of the lens holder 40. A screw insertion hole 63 is provided in the middle of each one of the legs 62, and a fastening screw 64 is screwed to the screw hole 46 that has a female or internal screw thread, thereby fixing the leg 62 to the boss 44. In this way, the peripheral portion 52 of the convex lens 50 is securely held so that it is engaged with the lens engaging portion 42 of the lens holder 40. In other words, the peripheral portion 52 of the convex lens 50 is securely sandwiched and held by the holding frame 61 of the lens fitting 60 and the lens engaging portion 42 of the lens holder 40. The lens fitting 60 can be easily manufactured by a sheet metal press work that includes a cutting process.

The lower end of the shade 80 that forms a clear cut line is tightened, along with the lower leg 62 of the lens fitting 60, to the lower side boss 44. Since the convex lens 50 and the shade 80 that forms a clear cut line are thus fixed together to the lens holder 40, assembling of the light source unit U is easy and performed quickly. Meanwhile, legs 82 of the shade 80 are respectively formed on the right and left sides, and they are sandwiched between the brackets 26 and 56 which are respectively provided on the mating portions of the reflector 20 and lens holder 40. The shade 80 is thus securely fixed to the lens holder 40. In addition, by way of mounting screws 66 to the brackets 26 of the reflector 20, to the legs 82 of the shade 38 and to the brackets 56 of the lens holder 40, the reflector 20 and the lens holder 40 are assembled into a single body.

In the above structure, the lens fitting 60, the bosses 44 and the fastening screws 64, which make a lens fixing means provided around the inside of the lens holder 40, do not protrude at all into the path of light which is reflected by the reflector 20 and travels toward the convex lens. Consequently, light that contributes to the light distribution of the lamp is not shaded by the lens fixing means. Furthermore, light, which is reflected by the lens fixing means and is undesirable for the light distribution, is shaded by the front edge (which is the lens engaging portion 42) of the lens holder 40; and thus such light is not emitted from the convex lens 50. Therefore, there is no problem in forming a desirable light distribution.

The light source unit U is structured so as to rotate in the horizontal direction in liaison with the operating of a steering wheel (not shown).

More specifically, as seen from FIG. 1, vertical shafts 48A and 48B are provided so as to protrude from the upper and lower surfaces of the light source unit U. These vertical shafts 48A and 48B are respectively supported via bearings 102 by brackets 100A and 100B which are respectively supported in the upper inside and lower inside of the lamp body 10. The light source unit U is thus rotatable in its entirety in the horizontal direction around the vertical shafts 48A and 48B.

As seen from FIG. 2, an arm 24 protrudes from the rear portion of the side surface of the light source unit U (the reflector 20). On the other hand, another arm 23 protrudes upward from the output shaft of a driving motor M which is securely mounted in the lamp body 10. A linkage 25 is connected by pins between the two arms 23 and 24, thus forming a linkage mechanism 22. The rotation of the motor M is transmitted to the light source unit U via the linkage mechanism 22 and oscillates the light source unit U about the vertical shafts 48A and 48B.

The motor M is controlled by a motor driving control circuit (not shown) so that it corresponds to the steering angle of the steering wheel such that the light source unit U (the light axis L of low beam) changes its direction, in liaison with the handle steering, within the area of horizontal direction θ, thereby providing a good visual recognition when driving a curve.

The reference numeral 90 denotes an extension reflector. The extension reflector 90 is disposed between the lamp body 10 and the front cover 11 so as to be inside the lamp chamber S. The extension reflector 90 has a circular opening portion that positionally corresponds to the light source unit U. An aluminum vapor deposition treatment (mirror face treatment), that is similar to the one applied on the reflector 20, is applied on the front side of the extension reflector 90, thereby hiding the surrounding area of the light source unit U, and as well, making the entire inside of the lamp chamber S appear as a single specular color and thus creating a good appearance of the headlamp.

Additionally, the area that extends from the convex lens 50 to the lens holder 40 of the light source unit U protrudes forward of the extension reflector 90. Accordingly, when the lamp is not lit, the front end portion of this light source unit U is seen from the front through the front cover 11. However, the front end portion of the light source unit U has a sleek oval shape, and the lens fixing means (that is comprised of the fitting 60, the bosses 44, the fastening screws 64) is not exposed at all on the outer peripheral surface of the light source unit U. Consequently, the front end portion, having a sleek oval shape, of the light source unit U is the only one thing that is seen through the front cover 11; and thus, the lamp has an aesthetic appearance.

Figure 4:
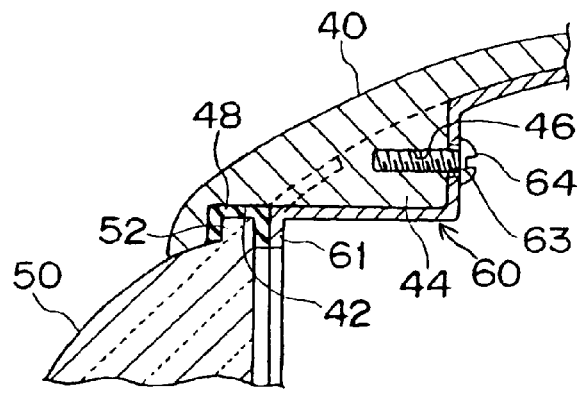
FIG. 4 is an enlarged longitudinal sectional view of the convex lens fixing means which is the main portion of the second embodiment of the present invention and is provided in the front edge of the lens holder.

FIG. 4 shows a spring (elastic) fixing structure that secures the convex lens in the front edge of the lens holder, the main portion of the second embodiment of the present invention.

In this second embodiment, an elastic member 48 is used. The elastic member 48 has a U-shaped transverse section (appearing in a reversed U-shape in FIG. 4) and is comprised of a heat resistant rubber or the like. The elastic member 48 covers the entire outer peripheral surface of the peripheral portion 52 of the convex lens 50. Te peripheral portion 52 of the convex lens 50 is thus supported by the lens engaging portion 42 and the lens fitting 60.

Dimensional errors that occurred in the manufacturing process of (the peripheral portion 52 of) the convex lens 50, the lens engaging portion 42, and (the leg 82 of) the shade 80 that forms a clear cut line are absorbed by the elastic member 48. As a result, the convex lens 50 and the shade 80 that forms a clear cut line can be fixed to the lens holder 40 without getting loosened.

The other configuration of the second embodiment is the same as that of the first embodiment described above, and thus explanations thereof are omitted to avoid redundancy by denoting the same reference numerals.

Figure 5:
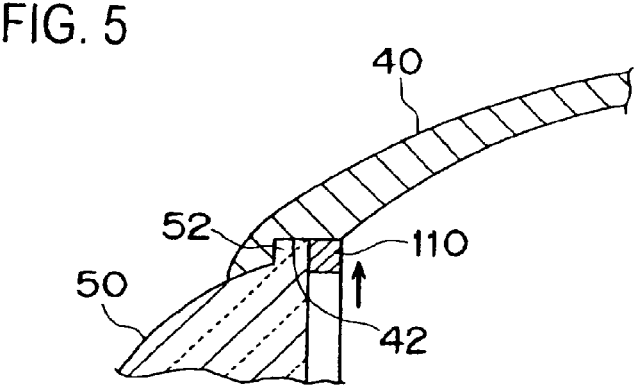
FIG. 5 is an enlarged longitudinal sectional view of the convex lens fixing means which is the main portion of the third embodiment of the present invention and is provided in the front edge of the lens holder.

FIG. 5 shows another structure for installing the convex lens in the front edge of the lens holder, the main portion of the third embodiment of the present invention.

In the first and second embodiments, the lens fixing means for fixing the convex lens 50 to the front edge of the lens holder 40 is comprised of the fastening screws 64, the bosses 44 having the screw holes and the lens fitting 60. However, in this third embodiment shown in FIG. 5, the lens fixing means is caulking.

More specifically, a caulking member 110 of a toric shape is loaded so as to contact the peripheral portion 52 of the convex lens 50 which is to be engaged with the lens engaging portion 42. Thus, with the plastic deformation force of the caulking member 110 in the outward direction or in the radial direction as shown by arrow in FIG. 5, the caulking member 110 is stuck to the lens engaging portion 42; and in this way, the peripheral portion 52 of the convex lens 50 is securely held to the lens engaging portion 42.

Figure 6:
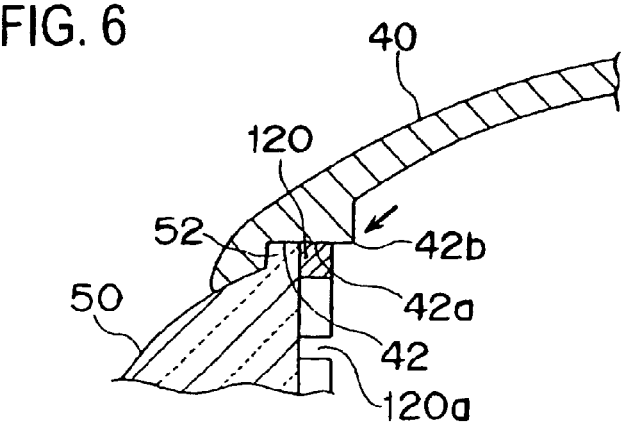
FIG. 6 is an enlarged longitudinal sectional view of the convex lens fixing means which is the main portion of the forth embodiment of the present invention and is provided in the front edge of the lens holder.
Figure 7:
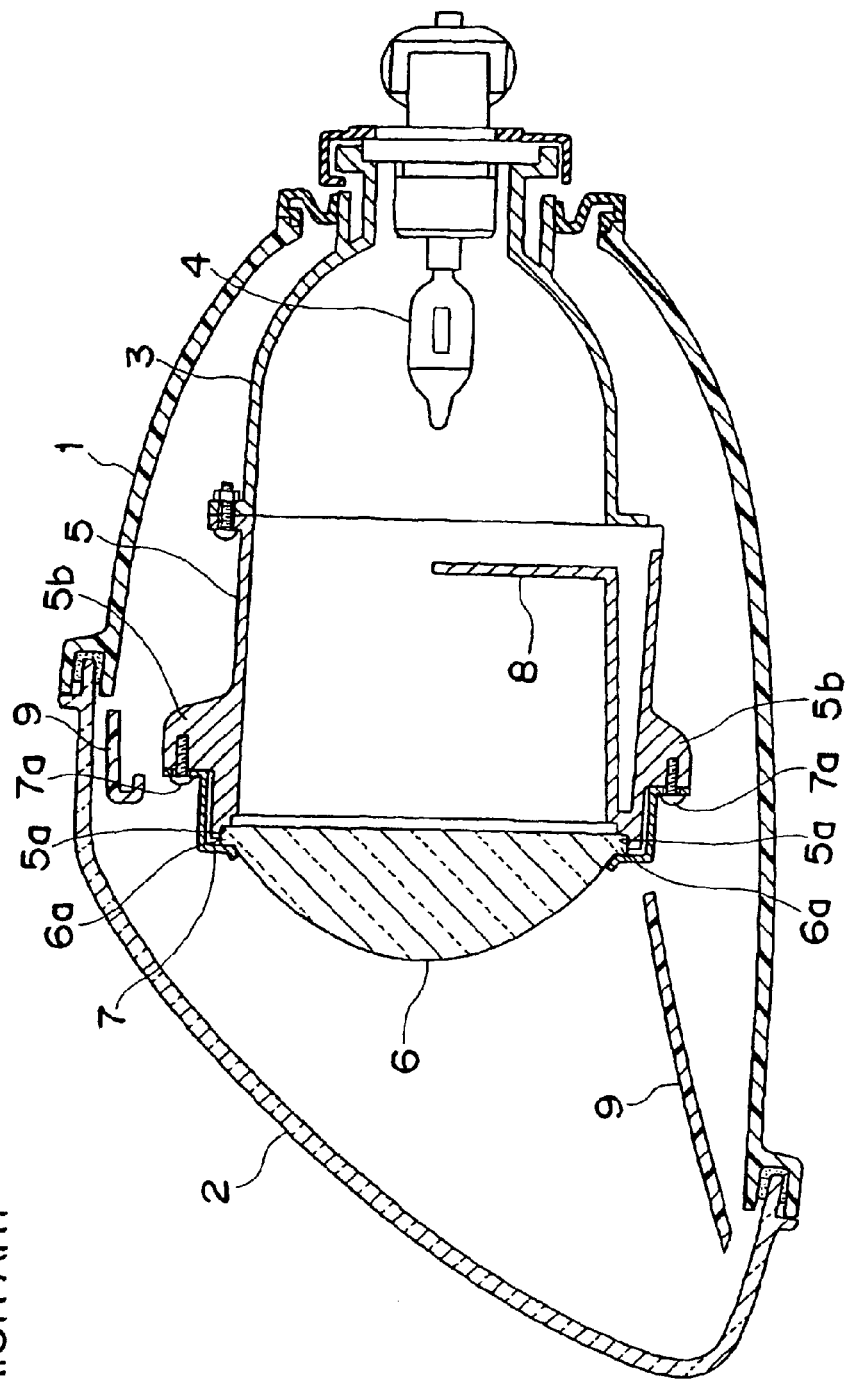
FIG. 7 is a longitudinal sectional view of a conventional vehicular lamp.

FIG. 6 shows still another structure for installing the convex lens in the front edge of the lens holder, the main portion of the fourth embodiment of the present invention.

In this forth embodiment, the lens fixing means is comprised of a C-ring 120. In other words, the toric C-ring 120 is provided so as to contact the peripheral portion 52 of the convex lens 50 and to be engaged with the lens engaging portion 42, and it is pressed against the inner peripheral wall 42a of the lens engaging portion 42. In FIG. 6, the reference numeral 120a denotes a slit, a C-shaped opening portion of the C-ring 120. Furthermore, by caulking the step portion 42b of the inner peripheral wall 42a that is the lens engaging portion 42 inwardly (in the direction of the arrow), the C-ring 120 is reliably clamped to the lens engaging portion 42.

In the above lamp structures, the light source unit U is rotatable in the horizontal direction in liaison with the steering of steering wheels. However, the light source unit U can be secured to the lamp body 10 so that it is not rotatable in the horizontal direction.

As is apparent from the above, the vehicular lamp of the present invention has an aesthetic appearance because the lens fixing means is not exposed at all to the outside of the lens holder (the light source unit), though the light source unit inside the lamp chamber is seen through the front cover when the lamp is not lit.

In the present invention, light that contributes to the formation of light distribution is emitted from the convex lens without being shaded by the lens fixing means, and light which is undesirable for the light distribution and is reflected by the lens fixing means is shaded by the front edge (the lens engaging portion) of the lens holder. Accordingly, light such as glare light, which is undesirable for the light distribution, is not emitted from the convex lens. Thus, there is no problem in forming a desirable light distribution even when the lens fixing means is provided inside the lens holder.

In addition, in the present invention, the convex lens is securely held easily and reliably to the lens engaging portion of the lens holder without getting loosened. In other words, the light source unit can be assembled quickly.

Furthermore, the lens fixing means of the present invention functions also as a means that fixes a shade that forms a clear cut line. On this account, a separate means for fixing a shade that forms a clear cut line is not required, and thus the light source unit can have a simpler structure. In addition, the light source unit can be assembled easily and quickly all the more since the convex lens and the shade that forms a clear cut line can be fixed to the lens holder at one time.

Furthermore, when the light is not lit, the front end portion that has a sleek oval shape in the light source unit inside the lamp chamber is seen through the front cover. This makes the appearance of the lamp good, allowing the vehicular lamp to be differentiated from other vehicular lamps of the same specification.

What is claimed is:

1. A vehicular lamp comprising a projection-type light source unit installed in a lamp chamber, wherein said projection-type light source unit is comprised of a reflector which is provided therein with a light source, a cylindrical lens holder which is disposed on a front end of said reflector, and a convex lens which is provided at a front end of said cylindrical lens holder so that a peripheral portion of said convex lens is fixed to a front edge of said lens holder by a lens fixing means, and wherein said lens holder is provided on an inner side of said front edge thereof with a lens engaging portion with which said peripheral portion of said convex lens is engaged from behind, said convex lens is securely held at an peripheral portion thereof on said lens engaging portion by said lens fixing means provided in said lens holder, an outer peripheral surface of said lens holder has a curved shape which is substantially continues from a convex surface of said convex lens, and an area from said convex lens to said lens holder of said light source unit protrudes forward of an extension reflector that is disposed inside said lamp chamber and extends around said light source unit.

2. The vehicular lamp according to claim 1, wherein said lens fixing means is provided outside of an outer diameter of said convex lens.

3. The vehicular lamp according to claim 1, wherein said lens engaging portion is comprised of an inner flange portion provided around an inside of said front edge of said lens holder, and said lens fixing means is comprised of:

a toric metal lens fitting that holds said peripheral portion of said convex lens to said lens engaging portion, a boss provided in said lens holder and formed therein with a screw hole, and a fastening screw that secures said lens fitting by being screwed into said screw hole.

4. The vehicular lamp according to claim 2, wherein said lens engaging portion is comprised of an inner flange portion provided around an inside of said front edge of said lens holder, and said lens fixing means is comprised of:

a toric metal lens fitting that holds said peripheral portion of said convex lens to said lens engaging portion, a boss provided in said lens holder and formed therein with a screw hole, and a fastening screw that secures said lens fitting by being screwed into said screw hole.

5. The vehicular lamp according to claim 3, wherein a shade that forms a clear cut line is fixed to said boss together with said lens fitting.

6. The vehicular lamp according to claim 4, wherein a shade that forms a clear cut line is fixed to said boss together with said lens fitting.

* * * * *